(12) United States Patent
Hoshino et al.

(10) Patent No.: US 10,779,921 B2
(45) Date of Patent: Sep. 22, 2020

(54) ORAL CAVITY WASHING DEVICE

(71) Applicant: PANASONIC INTELLECTUAL PROPERTY MANAGEMENT CO., LTD., Osaka (JP)

(72) Inventors: Junichi Hoshino, Shiga (JP); Tadanobu Kitagawa, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 280 days.

(21) Appl. No.: 15/802,332

(22) Filed: Nov. 2, 2017

(65) Prior Publication Data
US 2018/0140399 A1   May 24, 2018

(30) Foreign Application Priority Data
Nov. 18, 2016   (JP) .................... 2016-225536

(51) Int. Cl.
| | | |
|---|---|---|
| *A61C 17/02* | (2006.01) | |
| *A61C 17/028* | (2006.01) | |
| *A61C 17/22* | (2006.01) | |
| *A61C 17/20* | (2006.01) | |
| *A46B 11/00* | (2006.01) | |

(52) U.S. Cl.
CPC .......... *A61C 17/02* (2013.01); *A61C 17/0202* (2013.01); *A61C 17/028* (2013.01); *A61C 17/227* (2013.01); *A46B 11/001* (2013.01); *A61C 17/20* (2013.01)

(58) Field of Classification Search
CPC ...... A61H 13/00; A61H 13/005; A61C 17/00; A61C 17/005; A61C 17/02; A61C 17/0202; A61C 17/0208; A61C 17/028; A61C 17/0211; A61C 17/0217; A61C 17/032; A61C 17/036; A61C 17/14;
(Continued)

(56) References Cited

U.S. PATENT DOCUMENTS

| | | | | |
|---|---|---|---|---|
| 4,248,589 A | * | 2/1981 | Lewis | ................ A61C 17/0217 433/126 |
| 4,249,899 A | * | 2/1981 | Davis | ................ A61C 17/0217 222/146.5 |

(Continued)

FOREIGN PATENT DOCUMENTS

| | | |
|---|---|---|
| EP | 2 946 748 A1 | 11/2015 |
| JP | 57-010817 U | 1/1982 |

(Continued)

*Primary Examiner* — Justine R Yu
*Assistant Examiner* — Mayisha M Khan
(74) *Attorney, Agent, or Firm* — McDermott Will & Emery LLP

(57) ABSTRACT

An oral cavity washing device includes a body unit including a pump configured to discharge washing liquid, a tube connected to the body unit and configured to allow the discharged washing liquid to flow through the tube, a washing unit connected to the tube and configured to discharge the washing liquid, a joint portion configured to detachably attach the washing unit to the body unit, a disposing portion provided at the body unit and configured to allow the tube to be disposed at the disposing portion in a state where the washing unit is attached to the body unit, and an elastic member provided at the disposing portion.

4 Claims, 14 Drawing Sheets

(58) Field of Classification Search
CPC . B05B 11/0089; B05B 11/0091; B05B 15/65; A46B 11/0044; A46B 11/0048
See application file for complete search history.

(56) References Cited

U.S. PATENT DOCUMENTS

| | | | | |
|---|---|---|---|---|
| 4,460,805 | A * | 7/1984 | Johnson | H01B 17/306 16/2.2 |
| 5,378,149 | A * | 1/1995 | Stropko | A61C 17/0217 433/80 |
| 2006/0057539 | A1 * | 3/2006 | Sodo | A61C 17/032 433/80 |
| 2006/0282027 | A1 * | 12/2006 | Lu | A61C 17/032 601/162 |
| 2014/0272769 | A1 * | 9/2014 | Luettgen | A61C 17/0202 433/27 |
| 2014/0315142 | A1 * | 10/2014 | Montgomery | A61C 19/066 433/29 |
| 2015/0147717 | A1 * | 5/2015 | Taylor | A61C 17/0205 433/80 |

FOREIGN PATENT DOCUMENTS

| | | |
|---|---|---|
| JP | 2015-217174 A | 12/2015 |
| KR | 2011042429 A | 4/2011 |

* cited by examiner

ORAL CAVITY WASHING DEVICE

RELATED APPLICATIONS

This application claims the benefit of Japanese Application No. 2016-225536, filed on Nov. 18, 2016, the entire disclosure of which Application is incorporated by reference herein.

BACKGROUND

1. Technical Field

The present disclosure relates to an oral cavity washing device configured to wash an intraoral cavity with washing liquid.

2. Description of the Related Art

An exemplary well-known conventional oral cavity washing device includes a body unit having a tank configured to store washing liquid and a pump configured to discharge the washing liquid, a tube connected to the body unit and configured to allow the washing liquid discharged by the pump to flow through the tube, and a washing unit configured to discharge the washing liquid supplied through the tube. Unexamined Japanese Patent Publication No. 2015-217174 discloses an exemplarily conventional oral cavity washing device.

SUMMARY

The tube vibrates when the washing liquid discharged from the pump flows through the tube. The vibrating tube may be abraded when the tube comes into contact with the body unit.

According to an aspect of the present disclosure, an oral cavity washing device includes: a body unit including a pump configured to discharge washing liquid; a tube connected to the body unit and configured to allow the discharged washing liquid to flow through the tube; a washing unit connected to the tube and configured to discharge the washing liquid; a joint portion configured to detachably attach the washing unit to the body unit; a disposing portion provided at the body unit and configured to allow the tube to be disposed at the disposing portion in a state where the washing unit is attached to the body unit; and an elastic member provided at the disposing portion.

The oral cavity washing device according to the present disclosure is unlikely to cause abrasion of the tube.

DETAILED DESCRIPTION

Figure 1:
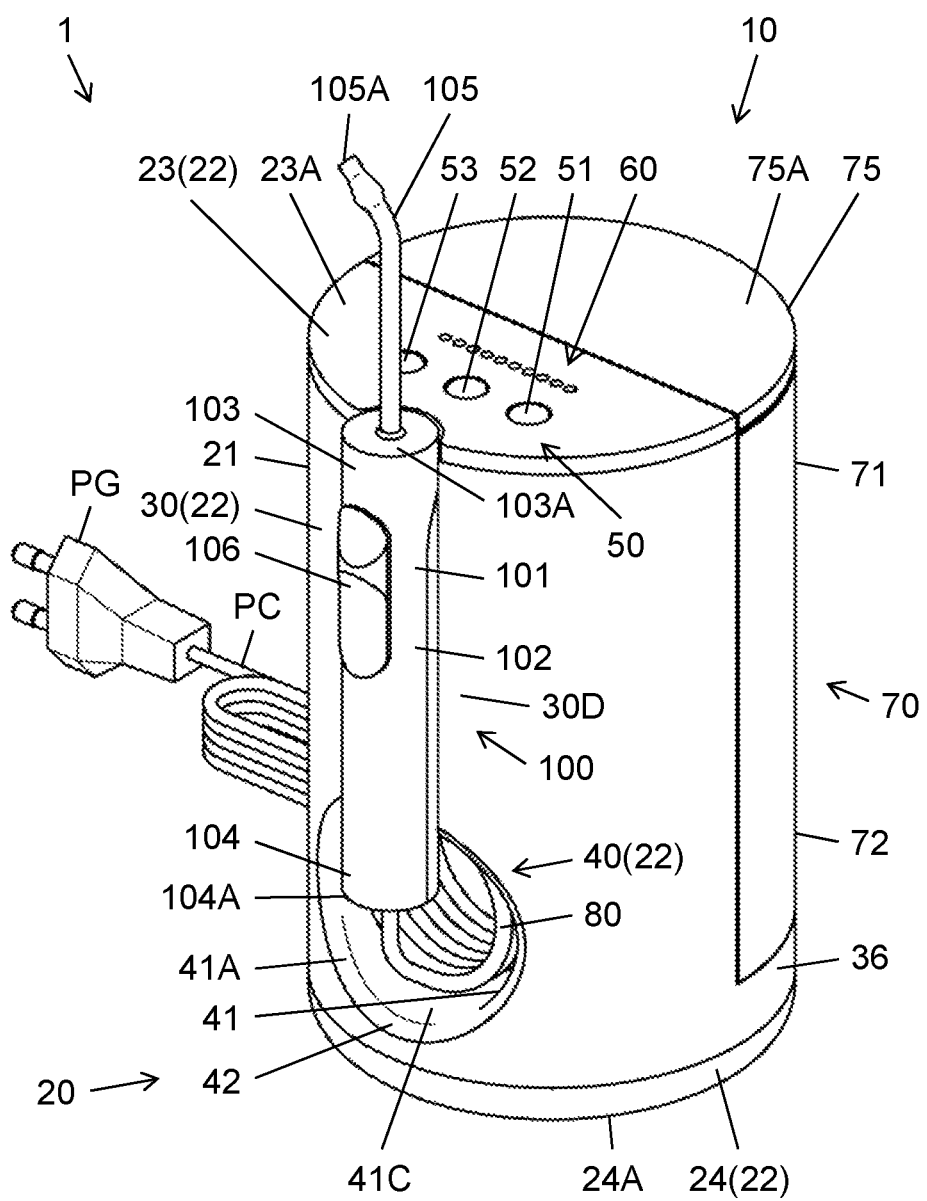
FIG. 1 is a perspective view of an oral cavity washing device according to an exemplary embodiment.

Oral Cavity Washing Device in Exemplary Practicable Mode

The present disclosure relates to an oral cavity washing device including: a body unit including a pump configured to discharge washing liquid; a tube connected to the body unit and configured to allow the discharged washing liquid to flow through the tube; a washing unit connected to the tube and configured to discharge the washing liquid; a joint portion configured to detachably attach the washing unit to the body unit a disposing portion provided at the body unit and configured to allow the tube to be disposed at the disposing portion in a state where the washing unit is attached to the body unit and an elastic member provided at the disposing portion. The disposing portion has a recess provided at the body unit. The elastic member is provided on an inner surface of the recess. The inner surface has a side surface and a bottom surface. The elastic member covers at least the side surface. The elastic member includes a first surface in contact with the side surface of the inner surface of the recess and a second surface opposite the first surface. The second surface of the elastic member forms a space within the recess and the space is configured to accommodate the tube in a curled state. The elastic member is provided at the disposing portion that is likely to contact with the tube. When the tube vibrates, the elastic member absorbs the vibration. This configuration inhibits abrasion of the tube.

The oral cavity washing device is exemplarily configured such that the disposing portion includes a recess provided at the body unit. The recess accommodates the tube in a state where the washing unit is attached to the body unit. The tube is thus unlikely to contact with any other object while the oral cavity washing device is not in use.

The oral cavity washing device is exemplarily configured such that the elastic member is provided at an edge of an opening of the recess. The elastic member is provided at the edge of the opening, which may come into strong friction contact with the tube. This configuration thus inhibits abrasion of the tube more effectively.

The oral cavity washing device is exemplarily configured such that the elastic member is provided at an inner peripheral surface of the recess. The elastic member is provided at the inner peripheral surface of the recess, which is likely to contact with the tube. This configuration thus inhibits abrasion of the tube more effectively. This configuration also reduces noise generated by contact between the tube and the inner peripheral surface of the recess.

The oral cavity washing device is exemplarily configured such that the oral cavity washing device further includes a connecting portion connecting the body unit and the tube, and the connecting portion is provided in the recess, and the elastic member is provided to seal the connecting portion. The elastic member is more valuable with a function of absorbing vibration of the tube and a function of sealing the connecting portion.

The oral cavity washing device is exemplarily configured such that the oral cavity washing device further includes a connecting portion connecting the body unit and the tube, and the connecting portion is provided at the disposing portion, and the elastic member is provided to seal the connecting portion. This oral cavity washing device exerts effects similar to effects achieved by the oral cavity washing device described above.

Exemplary Embodiment

FIG. 1 shows an outer appearance of oral cavity washing device 1. Oral cavity washing device 1 is used to wash an intraoral cavity, mainly to wash teeth and gums in an oral cavity. Oral cavity washing device 1 is placed on a flat installation surface such as a washstand (not shown). Oral cavity washing device 1 is driven by electric power supplied from an external power supply (not shown) such as a commercial power supply, and is configured to discharge washing liquid into an oral cavity. Examples of the washing liquid include clean water mixed with detergent, and clean water.

Oral cavity washing device 1 includes body unit 10, tube 80, washing unit 100, and power source cord PC. Body unit 10 includes device body 20 and tank 70. Tank 70 has a function of storing washing liquid. Tank 70 is detachably attached to device body 20, for example. Device body 20 accommodates various elements for driving oral cavity washing device 1. Device body 20 includes first case 21, pump 31, motor 32, and power source circuit 33 (see FIG. 7). First case 21 accommodates pump 31, motor 32, and power source circuit 33. Pump 31 has a function of discharging the washing liquid stored in tank 70. Motor 32 has a function of driving pump 31. Power source circuit 33 has a function of supplying motor 32 with electric power. Power source cord PC is electrically connected to power source circuit 33. Power source cord PC has a plug PG connected to the external power supply that supplies the power source circuit 33 with electric power.

Tube 80 is connected to body unit 10 so as to allow the washing liquid discharged from pump 31 to flow through tube 80. Washing unit 100 is connected to tube 80 so as to discharge the washing liquid. Washing unit 100 is detachably attached to body unit 10. FIG. 1 shows a state where washing unit 100 is attached to body unit 10. Washing unit 100 is detached from body unit 10 when washing unit 100 is used to wash the intraoral cavity.

First case 21 of device body 20 includes a plurality of parts 22 joined together. First case 21 is made of a material such as an acrylonitrile butadiene styrene (ABS) resin. The plurality of parts 22 includes upper lid 23, case body 30, bottom lid 24, and disposing portion 40. Parts 22 are individually molded products made of a resin material. Upper lid 23, bottom lid 24, and disposing portion 40 are each joined to case body 30. Upper lid 23 configures flat upper surface 23A of device body 20.

Examples of tube 80 include an extensibly curled tube. It is preferred to determine a type of a material, a diameter, and a thickness of tube 80 in accordance with mobility of washing unit 100 when washing unit 100 is moved around body unit 10, durability of tube 80, and the like. Examples of the material for tube 80 include a highly flexible resin material. The resin material is exemplified by an ethylene vinyl acetate copolymer (EVA) resin. The diameter of tube 80 is preferably within an exemplary range from 3.0 mm to 5.0 mm. The diameter of tube 80 can be 4.0 mm. The thickness of tube 80 is preferably within an exemplary range from 0.5 mm to 1.5 mm. The thickness of tube 80 can be 1.0 mm.

Washing unit 100 includes second case 101 and nozzle 105. Nozzle 105 is provided at second case 101 so as to discharge the washing liquid. Second case 101 is made of a material such as an ABS resin. Second case 101 includes grip portion 102. Grip portion 102 is configured to be gripped by a single hand of a user. Second case 101 includes first end portion 103 and second end portion 104. First end portion 103 has first end surface 103A. First end surface 103A is configured to allow nozzle 105 to be attached to first end surface 103A. Second end portion 104 is opposite to first end portion 103 of second case 101. Second end portion 104 has second end surface 104A. Tube 80 is inserted to second case 101 through second end surface 104A or the like, and is connected to an inlet of a passage that is provided in second case 101 and allows washing liquid to flow through the passage. Nozzle 105 is connected to an outlet of the passage.

Washing unit 100 further includes operation part 106. Operation part 106 is provided at grip portion 102. Operation part 106 has a function of opening and closing a check valve (not shown) provided in second case 101. When operation part 106 is operated to open the check valve, the washing liquid flowing through tube 80 is discharged from discharge port 105A of nozzle 105. When operation part 106 is operated to close the check valve, the washing liquid is not discharged from discharge port 105A of nozzle 105.

Body unit 10 further includes operation part 50 and display part 60. Operation part 50 has a function of selecting behavior of body unit 10 relevant mainly to discharge of washing liquid. Operation part 50 is provided at upper surface 23A of device body 20 or the like. Operation part 50 includes a plurality of buttons. The plurality of buttons includes first button 51, second button 52, and third button 53. First button 51 has a function of powering ON and powering OFF body unit 10. Second button 52 has a function of increasing hydraulic pressure of the washing liquid discharged from pump 31. Third button 53 has a function of decreasing the hydraulic pressure of the washing liquid discharged from pump 31. Second button 52 and third button 53 are operated to regulate the hydraulic pressure of the washing liquid discharged from pump 31 within a range of discharge pressure of pump 31. The range of the discharge pressure of pump 31 is preferably from 3.0 kgf/cm$^2$ to 8.0 kgf/cm$^2$ or the like. The washing liquid discharged from discharge port 105A of nozzle 105 has hydraulic pressure varied in accordance with the hydraulic pressure of the washing liquid discharged from pump 31.

Pump 31 has maximum discharge pressure preferably higher than predetermined maximum discharge pressure. The predetermined maximum discharge pressure is preferably determined in accordance with a relation with power of washing off plaque and the like in the oral cavity by the washing liquid discharged from discharge port 105A of nozzle 105. The predetermined maximum discharge pressure is preferred to be at least 4 kgf/cm$^2$ or the like. The predetermined maximum discharge pressure is more preferred to be at least 6 kgf/cm$^2$ or the like. The preferred predetermined maximum discharge pressure can be 8 kgf/cm$^2$.

Display part 60 has a function of displaying various information associated with operation at operation part 50. Display part 60 includes a plurality of light emitting diode (LED) lamps provided on upper surface 23A of device body 20 or the like. The LED lamps each have a lighting state varied in accordance with the hydraulic pressure of the washing liquid regulated with use of second button 52 and third button 53.

Disposing portion 40 is joined to case body 30 so as to be provided with tube 80 in the state where washing unit 100 is attached to body unit 10. Disposing portion 40 includes recess 41. Recess 41 is configured to accommodate tube 80. Recess 41 includes opening 41A opened to front surface 30D of case body 30.

Figure 2:
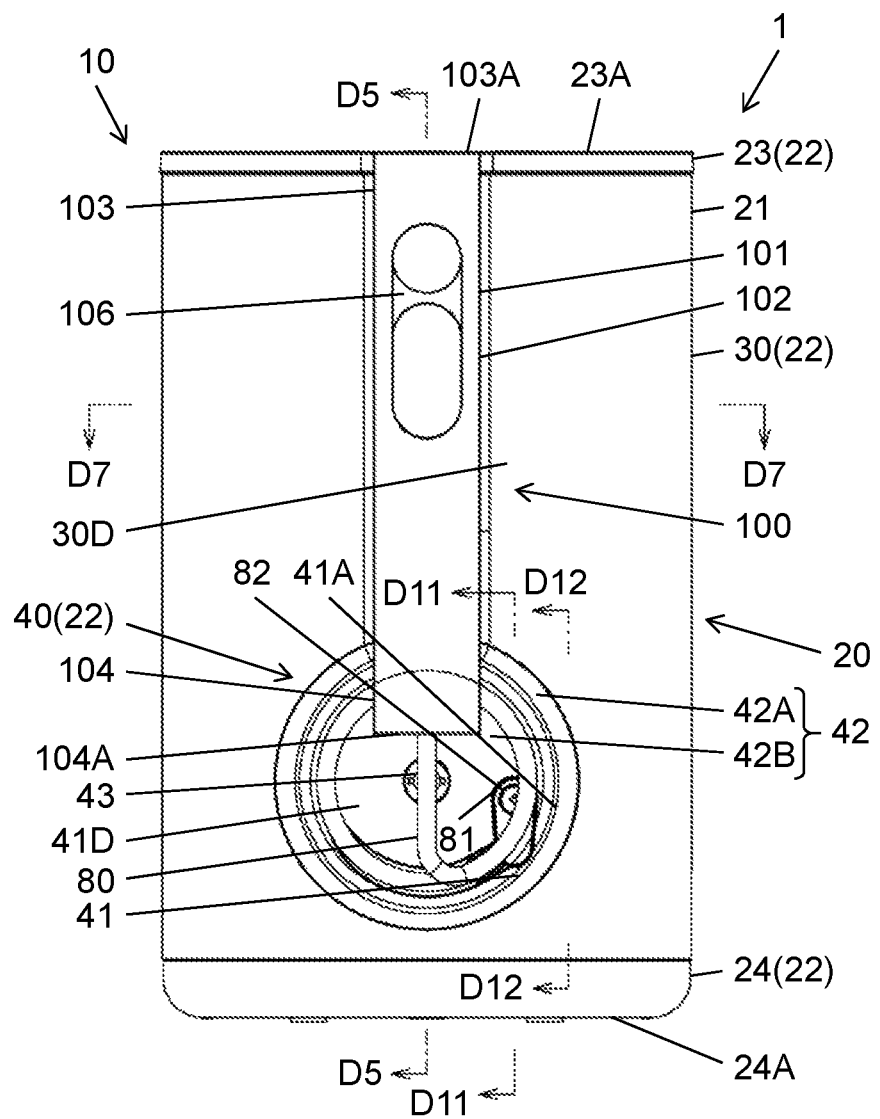
FIG. 2 is a front view of the oral cavity washing device shown in FIG. 1.

FIG. 2 is a front view of oral cavity washing device 1 with washing unit 100 attached to body unit 10 and without nozzle 105 that is removed from second case 101. Second case 101 of washing unit 100 is configured to cause second end portion 104 to face disposing portion 40 in the state where washing unit 100 is attached to body unit 10. This configuration allows second end portion 104 to be easily gripped for easy detachment of washing unit 100 from body unit 10.

Second case 101 is configured to allow first end surface 103A to substantially be flush with upper surface 23A of device body 20 in the state where washing unit 100 is attached to body unit 10. This configuration allows such a positional relation between first end surface 103A and upper surface 23A of device body 20 to serve as a guide for attaching washing unit 100 to body unit 10. The state where first end surface 103A is substantially flush with upper surface 23A of device body 20 includes a state where there is no difference in height between first end surface 103A and upper surface 23A of device body 20, and a state where there is provided a slight difference in height between first end surface 103A and upper surface 23A of device body 20. The slight difference in height is sized such that device body 20 and washing unit 100 being unlikely to obstruct a hand moving around body unit 10 are equally effective or are regarded as being substantially equally effective to the case where there is provided no difference in height between upper surface 23A of device body 20 and first end surface 103A of washing unit 100.

Figure 3:
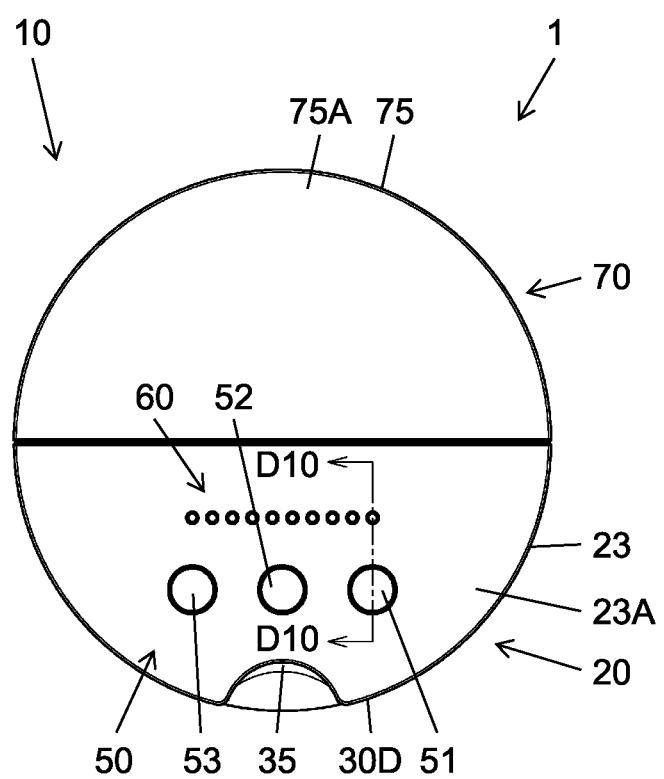
FIG. 3 is a plan view of a body unit shown in FIG. 1.

Body unit 10 is preferred to have an elliptical or approximately elliptical two-dimensional shape in a planar view. The two-dimensional shape of body unit 10 relates to a state where tank 70 is attached to device body 20, and is equal to a two-dimensional shape of body unit 10 projected on a plane perpendicular to a center axis of body unit 10. FIG. 3 is a plan view of oral cavity washing device 1 not provided with washing unit 100. The two-dimensional shape of body unit 10 in a planar view is exemplified by a circle as an example of the elliptical shape. When the two-dimensional shape of body unit 10 is an elliptical shape or an approximately elliptical shape, body unit 10 and tube 80 have a small contact area in a state where tube 80 (see FIG. 1) is in contact with body unit 10. Tank 70 and device body 20 each have a two-dimensional shape in a planar view, exemplified by a semi-ellipse or an approximate semi-ellipse. The two-dimensional shape of device body 20 in a planar view relates to the state where tank 70 is attached to device body 20.

Body unit 10 has a three-dimensional shape preferably like a column, an approximate column, a truncated cone, an approximate truncated cone, a cone, an approximate cone, a twin cone, an approximate twin cone, an ellipsoid, or an approximate ellipsoid. The three-dimensional shape of body unit 10 relates to the state where tank 70 is attached to device body 20. As shown in FIG. 1, the three-dimensional shape of body unit 10 is exemplified by an elliptical column as an example of the column. In a case where the three-dimensional shape of body unit 10 is one of those exemplified above, body unit 10 and tube 80 have a small contact area in the state where tube 80 is in contact with body unit 10. In the case where body unit 10 is shaped like the twin cone, the approximate twin cone, the ellipsoid, or the approximate ellipsoid, body unit 10 is preferably provided, at a bottom portion, with a support portion (not shown) allowing body unit 10 to stably be placed on the installation surface.

Terms expressing the two-dimensional shape and the three-dimensional shape of body unit 10 are classified into terms not provided with "approximate" as a prefix and terms provided with "approximate" as a prefix. The terms provided with "approximate" include the approximate ellipse, the approximate column, the approximate truncated cone, the approximate cone, the approximate twin cone, the approximate ellipsoid, and the approximate semi-ellipse. Graphics each described with a term not including "approximate" will be referred to as basic graphics. Graphics each described with a term including "approximate" will be referred to as similar graphics. With regard to the feature that body unit 10 and tube 80 have a small contact area, the similar graphics include a graphic being substantially equally effective to a case where the two-dimensional shape or the three-dimensional shape of body unit 10 has a basic graphic, and a graphic being significantly more effective in comparison to a conventional oral cavity washing device including body unit 10 having a planar side surface. Oral cavity washing device 1 is improved in designability because body unit 10 has the two-dimensional shape and the three-dimensional shape in a planar view each having a basic graphic or a similar graphic.

The similar graphic of the two-dimensional shape has various examples. According to a first example, the similar graphic of the two-dimensional shape partially includes a straight line. According to a second example, the similar graphic of the two-dimensional shape partially includes a curved line having an outside center. According to a third example, the similar graphic of the two-dimensional shape includes features of both the first and second examples.

The similar graphic of the three-dimensional shape has various examples. According to a first example, the similar graphic of the three-dimensional shape partially includes a plane. According to a second example, the similar graphic of the three-dimensional shape partially includes a projection. According to a third example, the similar graphic of the three-dimensional shape partially includes a recess. According to a fourth example, the similar graphic of the three-dimensional shape includes at least two features of the first to third examples.

Upper surface 23A of device body 20 is substantially flush with flat upper surface 75A of tank 70 or the like in the state where tank 70 is attached to device body 20. Body unit 10 is thus unlikely to obstruct a hand, washing unit 100, tube 80, and the like, which move around body unit 10.

The state where upper surface 23A of device body 20 is substantially flush with upper surface 75A of tank 70 includes a state where there is no difference in height between upper surface 23A of device body 20 and upper surface 75A of tank 70, and a state where there is provided a slight difference in height between upper surface 23A of device body 20 and upper surface 75A of tank 70. The slight difference in height is sized such that body unit 10 being unlikely to obstruct a hand, washing unit 100, tube 80, and the like moving around body unit 10 is equally effective or is regarded as being substantially equally effective to the case where there is provided no difference in height between upper surface 23A of device body 20 and upper surface 75A of tank 70.

Figure 4:
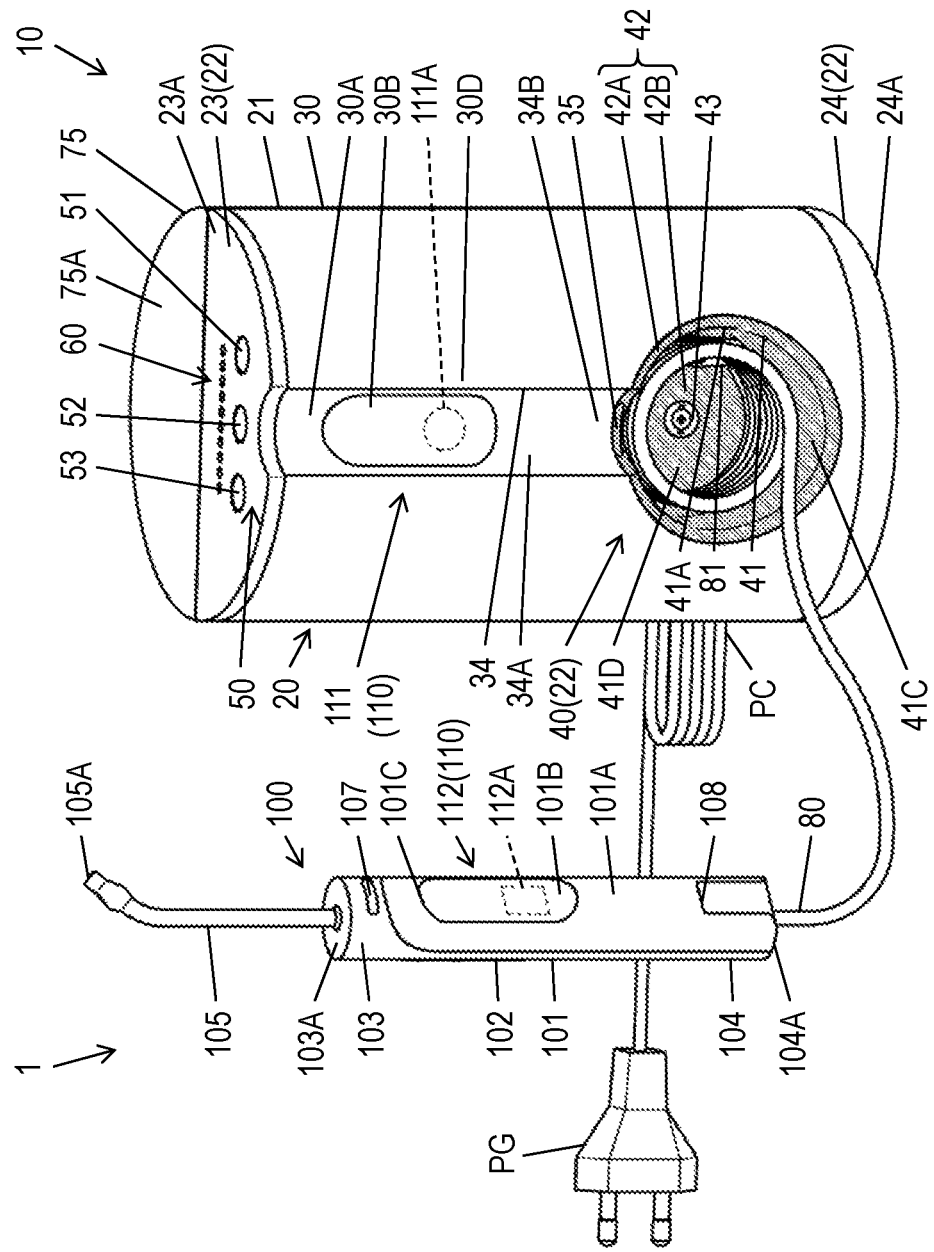
FIG. 4 is a perspective view showing a state where a washing unit is detached from the body unit.

FIG. 4 shows a state where washing unit 100 is detached from body unit 10. Washing unit 100 further includes detaching switch 107. Detaching switch 107 has a function of detaching nozzle 105 from second case 101. Detaching switch 107 is provided at a rear surface of first end portion 103 of second case 101, for example.

Oral cavity washing device 1 further includes elastic member 42. FIG. 4 shows a dotted portion corresponding to elastic member 42. Elastic member 42 is made of an elastic material or the like, which is unlikely to abrade tube 80 when elastic member 42 is in contact with tube 80. Examples of the elastic material include elastomer. Elastic member 42 is provided at disposing portion 40. Elastic member 42 is provided at disposing portion 40 that is likely to contact tube 80. When driven pump 31 (see FIG. 7) vibrates tube 80 located at disposing portion 40, elastic member 42 absorbs the vibration of tube 80. This configuration inhibits abrasion of tube 80. This configuration also reduces noise generated by vibration in comparison to a case where vibrating tube 80 comes into contact with a portion not covered with elastic member 42.

Elastic member 42 includes first elastic member 42A and second elastic member 42B. First elastic member 42A is provided at edge 41B (see FIG. 5) of opening 41A of recess 41, for example. First elastic member 42A can be provided at entire edge 41B of opening 41A. First elastic member 42A is provided at edge 41B of opening 41A, which may come into strong friction contact with tube 80. This configuration thus inhibits abrasion of tube 80 more effectively. Moreover, this configuration reduces noise generated by vibration in comparison to a case where vibrating tube 80 comes into contact with a portion not covered with first elastic member 42A.

Second elastic member 42B is provided at inner peripheral surface 41C and bottom surface 41D of recess 41, for example. Second elastic member 42B can be provided entirely at inner peripheral surface 41C and bottom surface 41D of recess 41. Second elastic member 42B is provided at inner peripheral surface 41C and bottom surface 41D of recess 41, which are likely to come into contact with tube 80. This configuration thus inhibits abrasion of tube 80 more effectively. Moreover, this configuration reduces noise generated by vibration in comparison to a case where vibrating tube 80 comes into contact with a portion not covered with second elastic member 42B.

Oral cavity washing device 1 further includes joint portion 110. Joint portion 110 has a function of detachably attaching washing unit 100 to body unit 10. Joint portion 110 joins body unit 10 and washing unit 100 by magnetic force or the like. This configuration allows washing unit 100 approaching body unit 10 to be joined to body unit 10 by magnetic force of joint portion 110.

Case body 30 further includes recess 34. Recess 34 is provided in front surface 30D of case body 30 or the like. Recess 34 is shaped correspondingly to an outline of washing unit 100. Recess 34 has surface 34A configuring a space in recess 34, and surface 34A is curved correspondingly to the outline of washing unit 100, for example. Washing unit 100 is disposed at recess 34 of body unit 10 in a state where joint portion 110 joins washing unit 100 to body unit 10. Joint portion 110 thus fixes posture of washing unit 100 joined to body unit 10.

Case body 30 includes first outer wall 30A and second outer wall 30B. First outer wall 30A configures an outline of case body 30. Second outer wall 30B as well as first outer wall 30A configure the outline of case body 30. Second outer wall 30B is provided at part of recess 34 of case body 30, for example. Second outer wall 30B is surrounded with first outer wall 30A. Detaching switch 107 provided at the rear surface of second case 101 of washing unit 100 forms a gap between the rear surface of second case 101 and surface 34A of recess 34 in the state where washing unit 100 is attached to body unit 10. Second outer wall 30B rises outward from first outer wall 30A of case body 30 to decrease the gap.

Joint portion 110 includes first joint portion 111 and second joint portion 112. First joint portion 111 is provided at front surface 30D of case body 30. First joint portion 111 is provided at surface 34A of recess 34 of case body 30, for example. First joint portion 111 includes magnet 111A, yoke 111B (see FIG. 6), and first accommodating portion 111C (see FIG. 6). Examples of magnet 111A include a neodymium magnet. Yoke 111B faces second outer wall 30B of case body 30 with magnet 111A being interposed therebetween (see FIG. 6), to allow a magnetic flux of magnet 111A to effectively be applied to second joint portion 112. Yoke 111B is made of a material such as low carbon steel. First accommodating portion 111C is provided at case body 30, so as to accommodate magnet 111A and yoke 111B. First accommodating portion 111C includes second outer wall 30B and inner wall 30C provided in case body 30 (see FIG. 6).

Recess 34 of case body 30 extends in a height direction of body unit 10, for example. Recess 34 has lower end portion 34B connected to recess 41 of disposing portion 40. Magnet 111A is provided on an inner surface side of recess 34 in second outer wall 30B of case body 30. Magnet 111A is provided on the inner surface side of recess 34 at a center in the height direction of body unit 10, for example. This configuration allows force of joint portion 110, which joins washing unit 100 to body unit 10, to be applied in a well-balanced manner to entire washing unit 100, and more effectively stabilizes the posture of washing unit 100 joined to body unit 10.

Second case 101 includes first outer wall 101A and second outer wall 101B. First outer wall 101A configures an outline of second case 101. Second outer wall 101B as well as first outer wall 101A configure the outline of second case 101. Second outer wall 101B is provided at part of the rear surface of second case 101, for example. Second outer wall 101B is surrounded with first outer wall 101A, and is recessed from first outer wall 30A toward an inside of second case 101. Second outer wall 101B of second case 101 is shaped to be fitted to second outer wall 30B of case body 30. This configuration increases magnetic force applied between first joint portion 111 and second joint portion 112.

Second joint portion 112 is provided at washing unit 100. Second joint portion 112 is provided at a rear surface of grip portion 102, in an intermediate portion in a height direction, for example. Second joint portion 112 includes ferromagnet 112A and second accommodating portion 112B (see FIG. 6). Examples of ferromagnet 112A include a cold-rolled steel sheet. This configuration prevents second joint portion 112 from attracting any ferromagnet around oral cavity washing device 1 in the state where washing unit 100 is detached from body unit 10. Ferromagnet 112A configures second joint portion 112, to achieve reduction in production cost in comparison to a case where each of first joint portion 111 and second joint portion 112 includes a magnet. Second accommodating portion 112B includes second outer wall 101B and inner wall 101D provided in second case 101 (see FIG. 6).

First outer wall 30A of case body 30 includes restricting portion 35. Restricting portion 35 has a function of restricting downward shift relative to body unit 10, of washing unit 100 attached to body unit 10. Restricting portion 35 is provided at lower end portion 34B of recess 34 of case body 30, for example. Restricting portion 35 is covered with elastic member 42 as exemplarily shown.

First outer wall 101A of second case 101 includes contact portion 108. Contact portion 108 is provided at a rear surface of second end portion 104 of second case 101, for example. Contact portion 108 comes into contact with restricting portion 35 when washing unit 100 shifts downward relatively to body unit 10. This configuration positions washing unit 100 in a height direction relatively to body unit 10 because contact portion 108 comes into contact with restricting portion 35 when washing unit 100 joined to body unit 10 is shifted downward relatively to body unit 10 due to own weight of washing unit 100, or the like.

Figure 5:
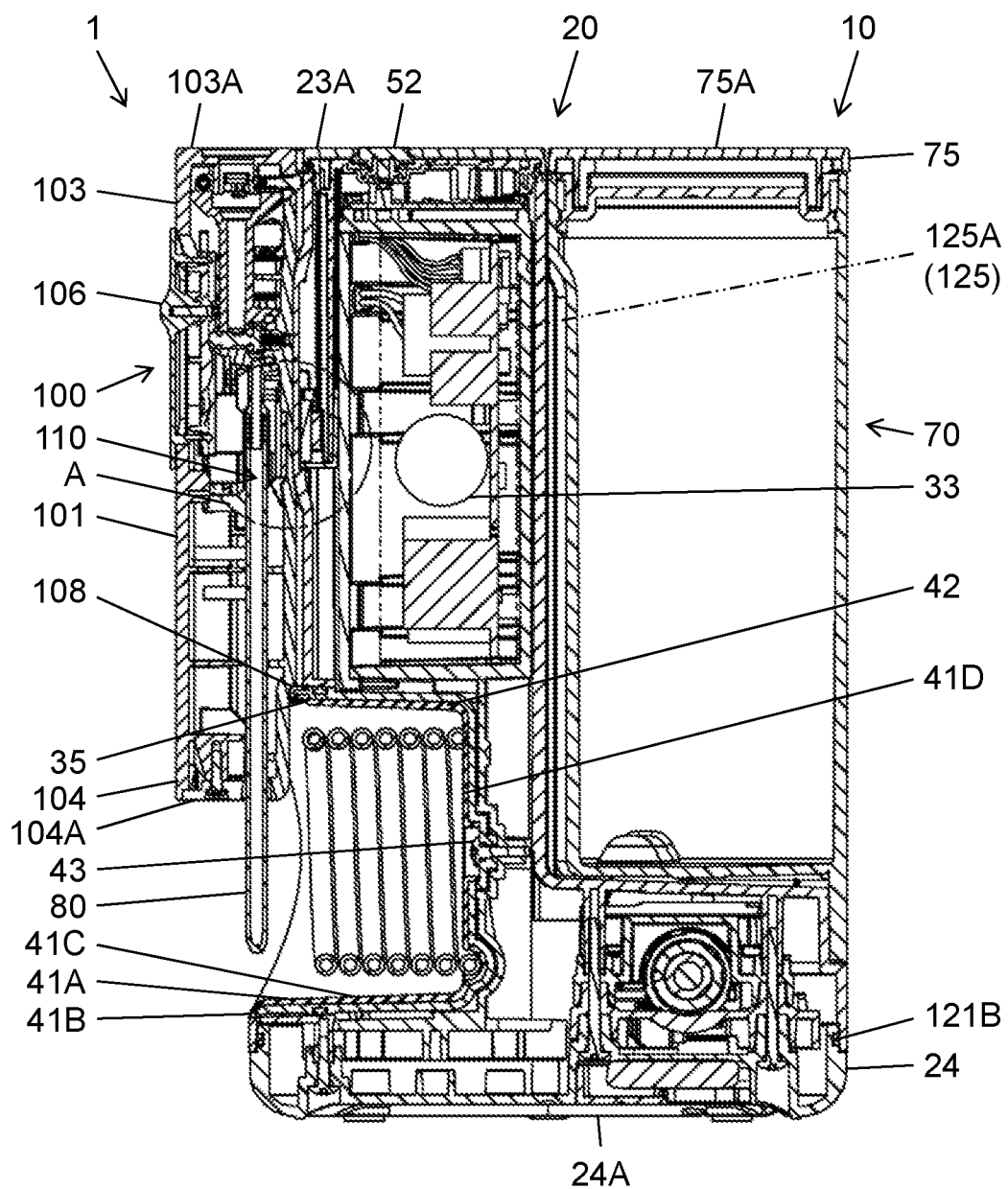
FIG. 5 is a sectional view taken along line D5-D5 indicated in FIG. 2.

As shown in FIG. 5, joint portion 110 and restricting portion 35 fix the position of washing unit 100 relative to body unit 10 in the state where washing unit 100 is attached to body unit 10. In the state where joint portion 110 and restricting portion 35 fix the position of washing unit 100 relative to body unit 10, first end surface 103A of second case 101 is substantially flush with upper surface 23A of device body 20.

Figure 6:
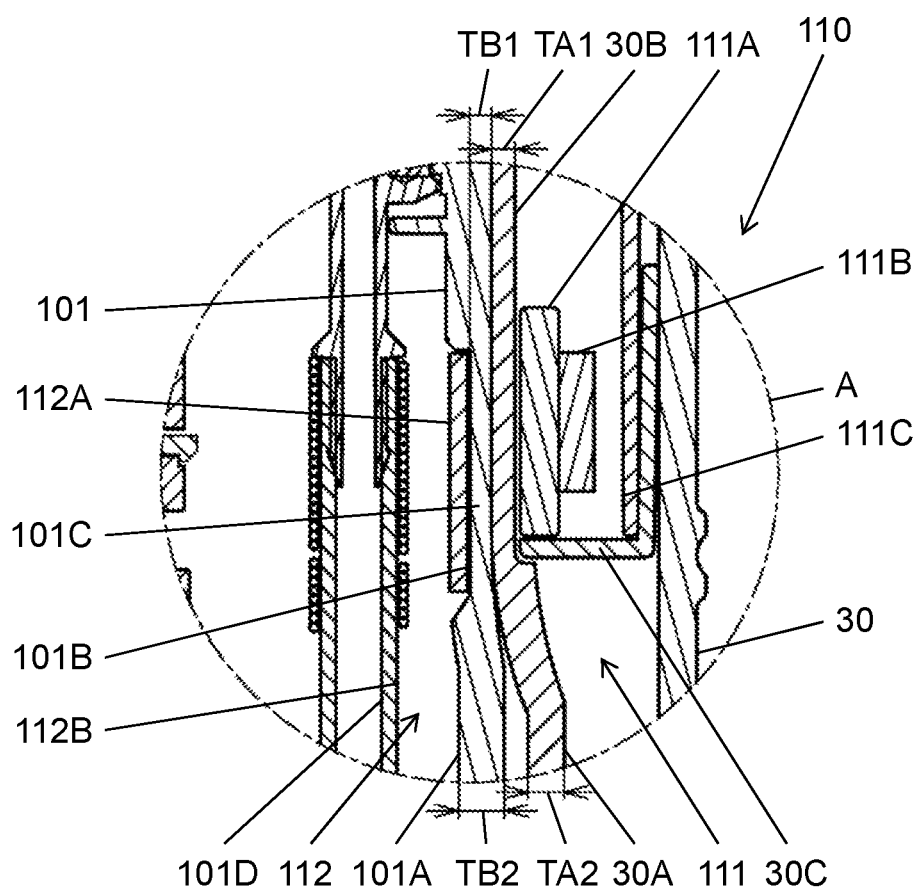
FIG. 6 is an enlarged view of a portion A indicated in FIG. 5.

FIG. 6 shows a relation between first joint portion 111 and second joint portion 112. Magnet 111A of first joint portion 111 is fixed to second outer wall 30B of case body 30 in first accommodating portion 111C. Yoke 111B is attached to magnet 111A. Second outer wall 30B of case body 30 has thickness TA1 smaller than thickness TA2 of first outer wall 30A of case body 30 in a portion around second outer wall 30B in the height direction of body unit 10. This configuration increases magnetic force applied between first joint portion 111 and second joint portion 112.

Second outer wall 101B of second case 101 includes thin portion 101C. Ferromagnet 112A of second joint portion 112 is fixed to thin portion 101C of second outer wall 101B in second accommodating portion 112B. Thin portion 101C of second outer wall 101B of second case 101 has thickness TB1 smaller than thickness TB2 of first outer wall 101A of second case 101 in a portion around second outer wall 101B in the height direction of washing unit 100. This configuration increases magnetic force applied between first joint portion 111 and second joint portion 112.

Figure 7:
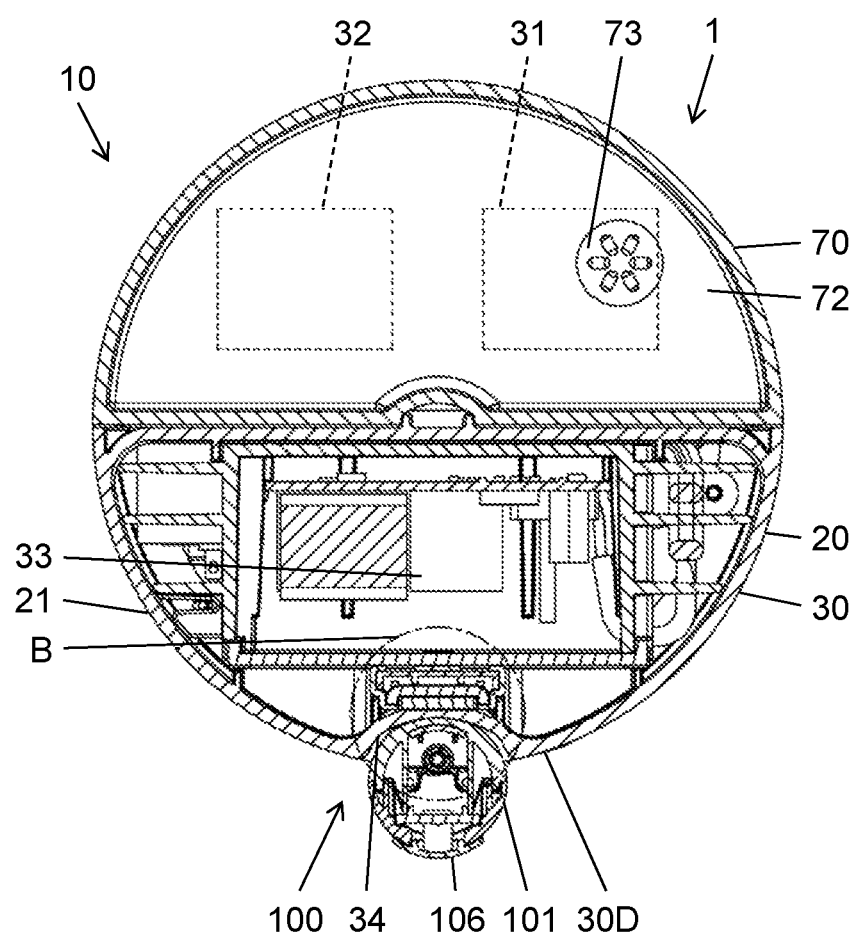
FIG. 7 is a sectional view taken along line D7-D7 indicated in FIG. 2.

As shown in FIG. 7, washing unit 100 is fitted to recess 34 of case body 30 so as to be attached to body unit 10. Oral cavity washing device 1 thus configured is unlikely to have a two-dimensional shape including a large projection in a planar view. Oral cavity washing device 1 is thus more effectively improved in designability.

Figure 8:
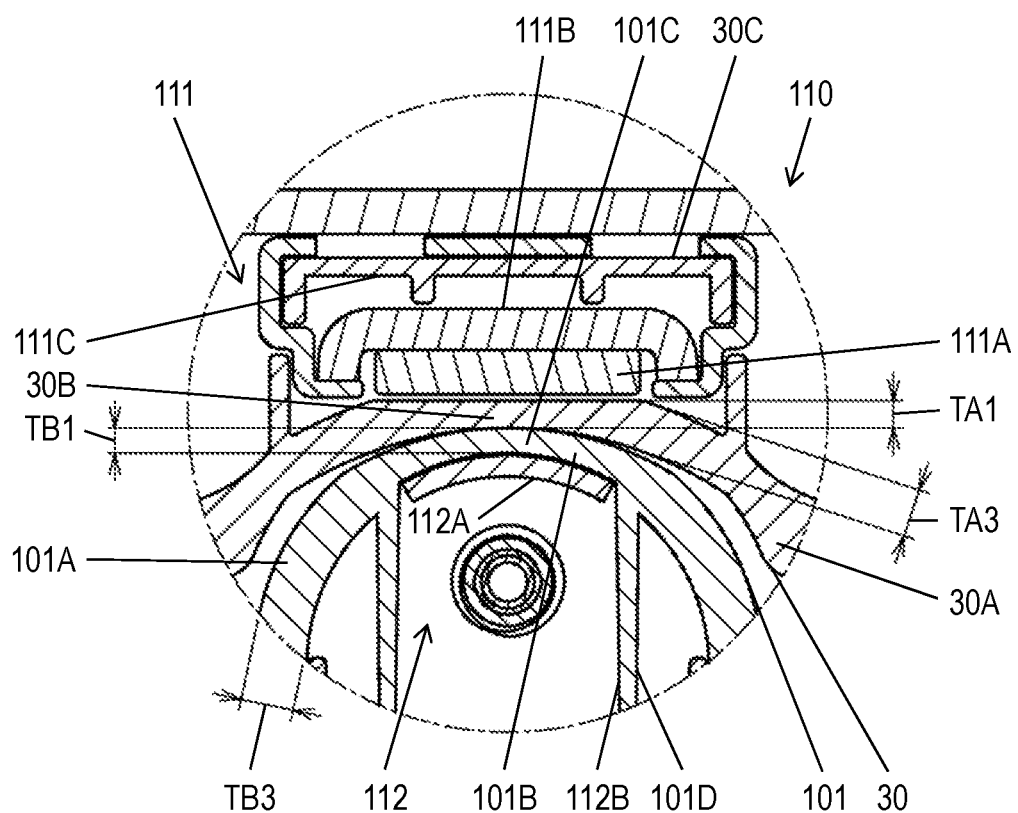
FIG. 8 is an enlarged view of a portion B indicated in FIG. 7.

As shown in FIG. 8, second outer wall 30B of case body 30 has the thickness TA1 smaller than thickness TA3 of first outer wall 30A of case body 30 in a portion around second outer wall 30B in a width direction of body unit 10. Thin portion 101C of second outer wall 101B of second case 101 has the thickness TB1 smaller than thickness TB3 of first outer wall 101A of second case 101 in a portion around second outer wall 101B in a width direction of washing unit 100.

Figure 9:
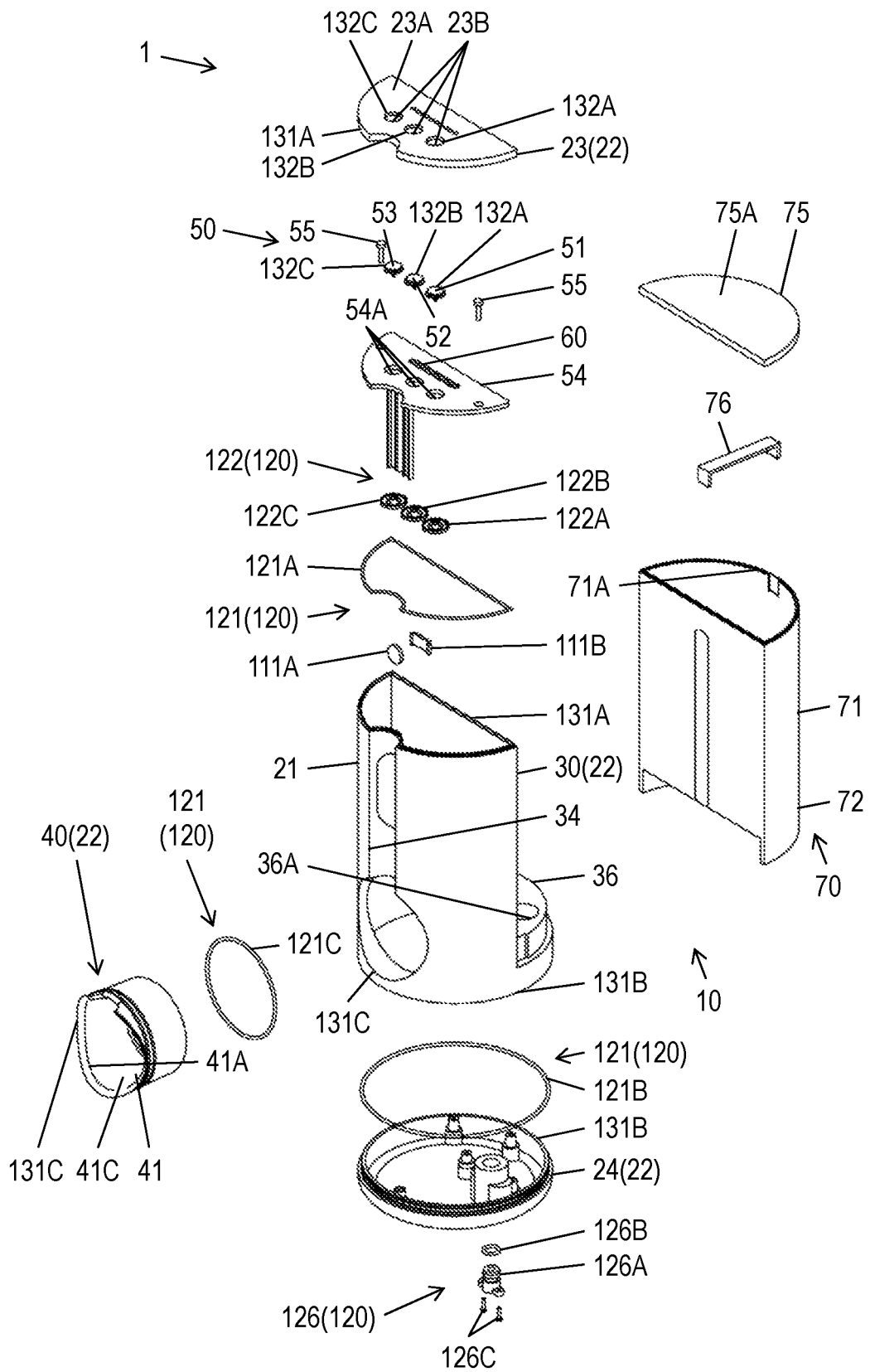
FIG. 9 is an exploded perspective view of the body unit shown in FIG. 1.

FIG. 9 shows exploded various elements configuring body unit 10. This figure does not show part of body unit 10.

Tank 70 includes tank body 71, bottom portion 72, drain port 73 (see FIG. 7), outlet 74 (see FIG. 12), lid 75, and handle 76. Tank body 71 is provided to store washing liquid. The washing liquid is poured into tank body 71 through opening 71A. Bottom portion 72 configures a bottom surface of tank body 71. Drain port 73 has a function of discharging the washing liquid stored in tank body 71. There is provided a float valve (not shown) configured to regulate an amount of the drained washing liquid. Drain port 73 is provided at an inner surface of bottom portion 72. Outlet 74 is provided at an outer surface of bottom portion 72 so as to communicate with drain port 73. Lid 75 is detachably attached to tank body 71, and opens and closes opening 71A of tank body 71. Lid 75 being attached to tank body 71 configures upper surface 75A of tank 70. Handle 76 is provided in tank body 71 at a position adjacent to opening 71A.

Case body 30 includes support portion 36. Support portion 36 has a function of supporting bottom portion 72 of tank 70. Support portion 36 is shaped similarly to tank 70 in a planar view. Support portion 36 includes water supply port 36A. Water supply port 36A is connectable with outlet 74 of tank 70. When tank 70 is attached to device body 20, outlet 74 of tank 70 is connected to water supply port 36A of support portion 36. Water supply port 36A is connected to pump 31. The washing liquid stored in tank 70 is discharged from drain port 73, passes through outlet 74 and water supply port 36A, and flows into pump 31.

Operation part 50 further includes panel 54. Buttons 51 to 53 and display part 60 are attached to panel 54. Upper lid 23 of first case 21 includes a plurality of holes 23B allowing buttons 51 to 53 to be exposed to outside. Panel 54 includes a plurality of holes 54A allowing buttons 51 to 53 to be inserted to holes 54A. After panel 54 is fixed to case body 30 with a plurality of screws 55, upper lid 23 is joined to case body 30.

Oral cavity washing device 1 further includes sealing structure 120. Sealing structure 120 has a function of inhibiting entry of water to first case 21. Sealing structure 120 is provided at first case 21. Oral cavity washing device 1 has an international protection class IPX7 or the like.

Sealing structure 120 includes first sealing portion 121 and second sealing portion 122. First sealing portion 121 seals seams 131A to 131C between the plurality of parts 22 on an outline of first case 21. First sealing portion 121 includes first sealing member 121A, second sealing member 121B, and third sealing member 121C.

First sealing member 121A has a function of sealing seam 131A between upper lid 23 and case body 30. First sealing member 121A is made of a material such as rubber. When first sealing member 121A is sandwiched between panel 54 of operation part 50 and case body 30 and panel 54 is fixed to case body 30 with screws 55, first sealing member 121A seals seam 131A between upper lid 23 and case body 30.

Second sealing member 121B has a function of sealing seam 131B between bottom lid 24 and case body 30. Second sealing member 121B is made of a material such as rubber. When second sealing member 121B is sandwiched between bottom lid 24 and case body 30 and bottom lid 24 is fixed to case body 30 with a screw (not shown) or the like, second sealing member 121B seals seam 131B between bottom lid 24 and case body 30.

Third sealing member 121C has a function of sealing seam 131C between disposing portion 40 and case body 30. Third sealing member 121C is made of a material such as rubber. When third sealing member 121C is sandwiched between disposing portion 40 and case body 30 and disposing portion 40 is fixed to case body 30 with screw 43 (see FIG. 4), third sealing member 121C seals seam 131C between disposing portion 40 and case body 30.

Second sealing portion 122 seals seams 132A to 132C between first case 21 and operation part 50. Second sealing portion 122 includes first sealing member 122A, second sealing member 122B, and third sealing member 122C.

First sealing member 122A has a function of sealing seam 132A between upper lid 23 and first button 51. First sealing member 122A is made of a material such as rubber. First sealing member 122A is provided to seal a gap between panel 54 and first button 51 inserted to hole 54A of panel 54 (see FIG. 10), for example. When first sealing member 122A is placed to seal the gap between first button 51 and panel 54 and upper lid 23 is joined to case body 30, first sealing member 122A seals seam 132A between upper lid 23 and first button 51. Second sealing member 122B has a function of sealing seam 132B between upper lid 23 and second button 52. Third sealing member 122C has a function of sealing seam 132C between upper lid 23 and third button 53. Second sealing member 122B and third sealing member 122C are configured substantially similarly to first sealing member 122A.

Figure 10:
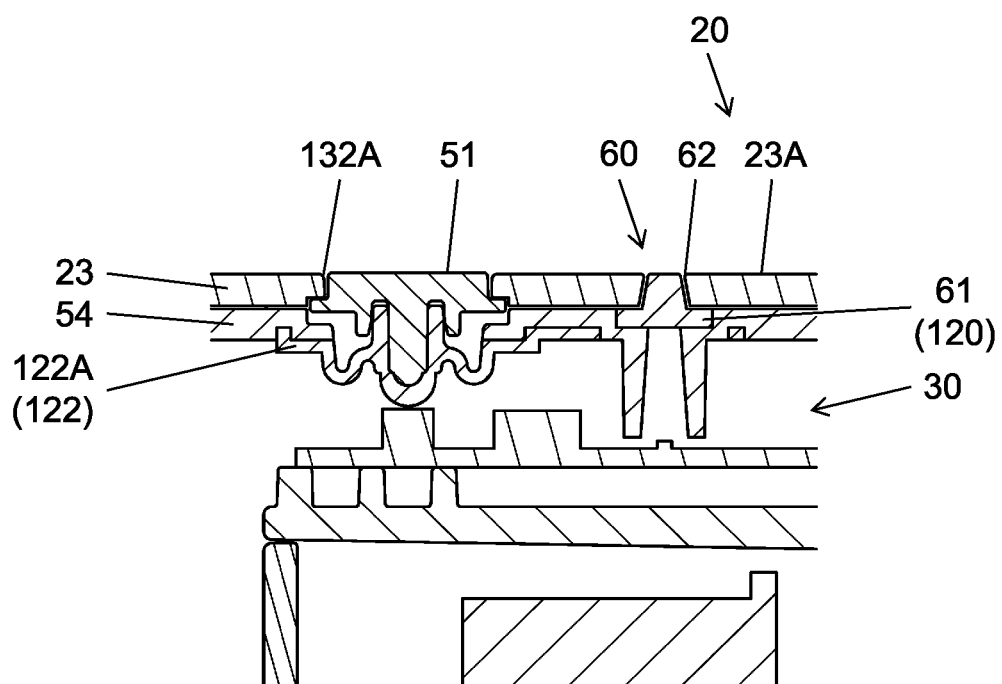
FIG. 10 is a sectional view taken along line D10-D10 indicated in FIG. 3.

As shown in FIG. 10, sealing structure 120 further includes sealing member 61. Sealing member 61 has a function of sealing seam 62 between upper lid 23 and display part 60. Sealing member 61 is made of a material such as rubber. Sealing member 61 covers display part 60 to seal display part 60, for example. When sealing member 61 is placed to cover display part 60 and upper lid 23 is joined to case body 30, sealing member 61 seals seam 62 between upper lid 23 and display part 60. Sealing member 61 optionally configures part of second sealing portion 122.

Figure 11:
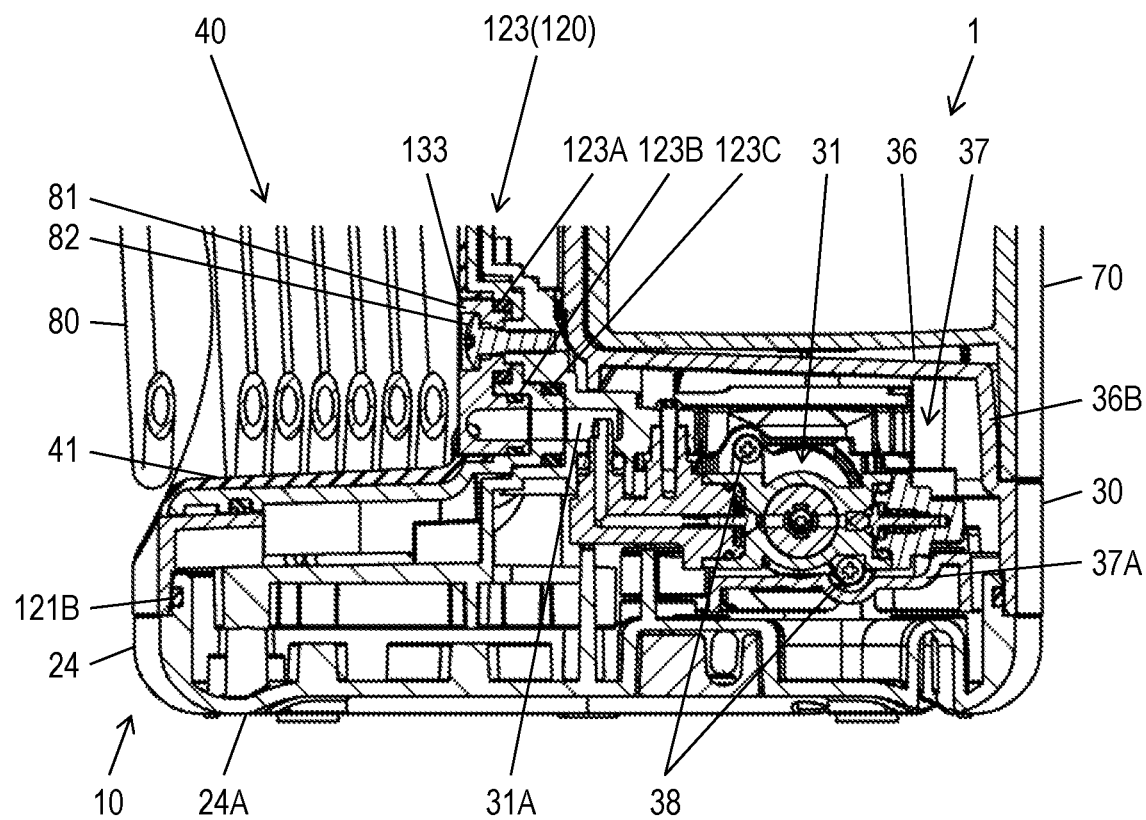
FIG. 11 is a sectional view taken along line D11-D11 indicated in FIG. 2.

As shown in FIG. 11, oral cavity washing device 1 further includes connecting portion 81. Connecting portion 81 connects body unit 10 and tube 80. Connecting portion 81 is provided in recess 41 of disposing portion 40 to configure a connection between case body 30 and tube 80, for example.

Sealing structure 120 further includes third sealing portion 123. Third sealing portion 123 has a function of sealing seam 133 between connecting portion 81 and body unit 10. Third sealing portion 123 is embodied by elastic member 123A or the like. Elastic member 123A is configured by an O-ring or the like. Elastic member 123A is provided at disposing portion 40 to seal connecting portion 81. When third sealing portion 123 is sandwiched between connecting portion 81 and disposing portion 40 and connecting portion 81 is fixed to case body 30 via disposing portion 40 with screw 82, third sealing portion 123 seals seam 133 between connecting portion 81 and body unit 10. Oral cavity washing device 1 further includes two elastic members 123B, 123C that inhibit leakage of water flowing from flow passage 31A connecting pump 31 and tube 80 into body unit 10. Elastic members 123B, 123C are each configured by an O-ring or the like.

Oral cavity washing device 1 further includes pump accommodating portion 37. Pump accommodating portion 37 has a function of accommodating pump 31. Pump accommodating portion 37 is provided in support portion 36 of case body 30, for example. Pump accommodating portion 37 is configured by outer wall 36B of support portion 36. Pump accommodating portion 37 includes pump support portion 37A supporting pump 31. Pump accommodating portion 37 and pump support portion 37A configure part of case body 30, and are made of a resin material similarly to a remaining portion of case body 30. Pump support portion 37A includes a rib (not shown) provided at an inner surface of outer wall 36B. Pump 31 is fixed to the rib with a coupler or the like. The coupler includes fitting structures provided at both pump 31 and the rib.

The coupler is exemplified by a plurality of screws 38.

Figure 12:
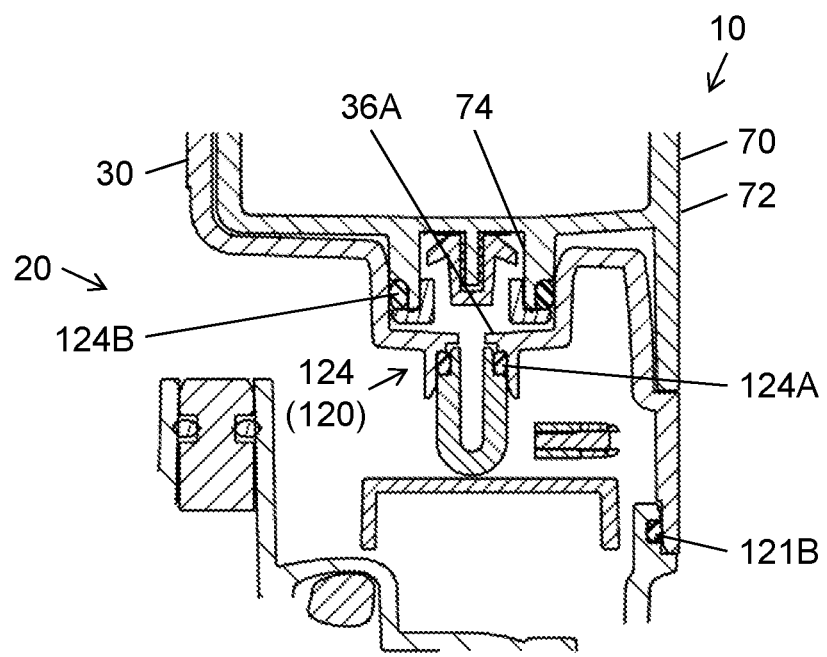
FIG. 12 is a sectional view taken along line D12-D12 indicated in FIG. 2.

As shown in FIG. 12, sealing structure 120 further includes fourth sealing portion 124. Fourth sealing portion 124 has a function of sealing water supply port 36A of case body 30. Fourth sealing portion 124 is embodied by elastic member 124A. Elastic member 124A is configured by an O-ring or the like. Fourth sealing portion 124 is fitted in water supply port 36A to seal water supply port 36A. This configuration is thus unlikely to allow entry of water to body unit 10 also in a state where tank 70 is detached from device body 20.

Oral cavity washing device 1 further includes elastic member 124B sealing a gap between outlet 74 of tank 70 and water supply port 36A of case body 30. Elastic member 124B is configured by an O-ring or the like. Elastic member 124B is fixed to a periphery of outlet 74 of tank 70. Elastic member 124B inhibits external leakage of the washing liquid discharged from outlet 74 of tank 70 in the state where tank 70 is attached to device body 20.

Sealing structure 120 further includes fifth sealing portion 125 (see FIG. 5). Fifth sealing portion 125 configures waterproof layer 125A. Waterproof layer 125A has a function of covering power source circuit 33. Waterproof layer 125A is provided as a resin layer formed by potting or the like. Examples of the resin material for waterproof layer 125A include a urethane resin. Waterproof layer 125A thus achieves further improvement in waterproof property of power source circuit 33. FIG. 5 includes a two-dot chain line indicating waterproof layer 125A.

Figure 13:
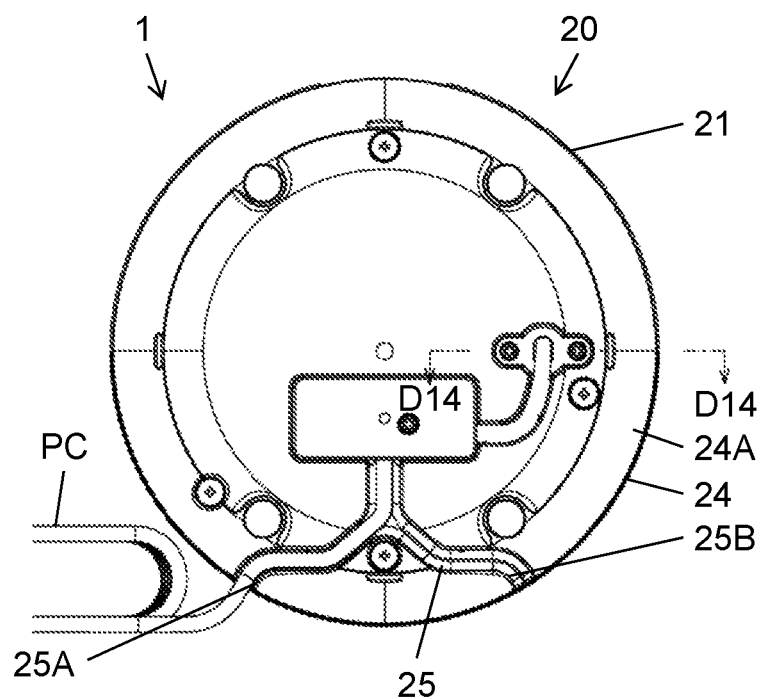
FIG. 13 is a bottom view of the body unit shown in FIG. 1.

As shown in FIG. 13, device body 20 further includes wiring passage 25. Wiring passage 25 holds power source cord PC led out of first case 21. Wiring passage 25 is provided at bottom surface 24A of bottom lid 24. Wiring passage 25 is biforked, for example. Wiring passage 25 includes first outlet 25A and second outlet 25B. Outlets 25A, 25B allow power source cord PC to be led out of device body 20. First outlet 25A and second outlet 25B are axially symmetrical with respect to a center line in a width direction of device body 20. Outlets 25A, 25B are provided laterally to bottom lid 24 or the like. FIG. 13 exemplarily shows power source cord PC led out of first outlet 25A. In this configuration, power source cord PC is unlikely to restrict installation of oral cavity washing device 1.

Figure 14:
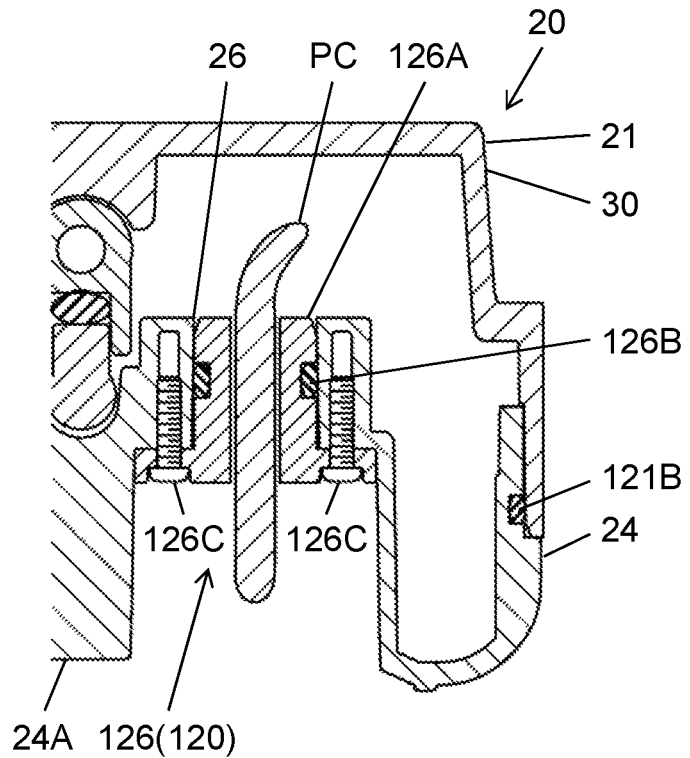
FIG. 14 is a sectional view taken along line D14-D14 indicated in FIG. 13.

As shown in FIG. 14, device body 20 further includes lead-out portion 26. Lead-out portion 26 allows power source cord PC to be led out of first case 21. Lead-out portion 26 is provided at bottom surface 24A of bottom lid 24.

Sealing structure 120 further includes sixth sealing portion 126. Sixth sealing portion 126 seals a gap between bottom lid 24 and power source cord PC in lead-out portion 26. Sixth sealing portion 126 includes bushing 126A and sealing member 126B. Bushing 126A is provided at power source cord PC so as to be inserted to lead-out portion 26. Bushing 126A is formed integrally with power source cord PC, for example. Sealing member 126B has a function of sealing a gap between bushing 126A and lead-out portion 26. Sealing member 126B is configured by an O-ring or the like. When sealing member 126B is sandwiched between bushing 126A and lead-out portion 26 and bushing 126A is fixed to bottom lid 24 with screw 126C, sealing member 126B seals the gap between bushing 126A and lead-out portion 26. Sealing structure 120 including first to sixth sealing portions 121 to 126 satisfies the class IPX7. Sealing structure 120 is thus unlikely to allow entry of water to body unit 10 even in a case where body unit 10 is immersed in water, so that body unit 10 is washed efficiently.

Exemplary steps of using oral cavity washing device 1 will be described with reference to FIG. 1.

Oral cavity washing device 1 is used by a user or the like in a following manner. In a first step, a predetermined amount of the washing liquid is poured into tank 70, and tank 70 is attached to device body 20. In a second step, first button 51 of body unit 10 is operated to power on oral cavity washing device 1. When oral cavity washing device 1 is powered on, pump 31 (see FIG. 7) starts being driven. In a third step, washing unit 100 is detached from body unit 10, and discharge port 105A of nozzle 105 is directed into an oral cavity. In a fourth step, operation part 106 of washing unit 100 is operated to discharge the washing liquid from discharge port 105A. The washing liquid discharged from discharge port 105A thus washes the intraoral cavity.

In a fifth step, washing unit 100 is attached to body unit 10 upon interruption or termination of washing the intraoral cavity with oral cavity washing device 1. Upon interruption of washing the intraoral cavity with oral cavity washing device 1 in the fifth step, the third to fifth steps are repeated.

The washing liquid discharged from pump 31 passes through tube 80 in a process of discharging the washing liquid from discharge port 105A, so that tube 80 is vibrated due to hydraulic pressure of the washing liquid flowing through tube 80, for example. Magnitude of vibration of tube 80 depends on magnitude of hydraulic pressure of the washing liquid discharged from pump 31. Vibrating tube 80 thus comes into contact with body unit 10. Oral cavity washing device 1 includes elastic member 42 at disposing portion 40 that is likely to contact with tube 80, and elastic member 42 thus absorbs vibration of tube 80. This configuration inhibits abrasion of tube 80. This configuration also reduces noise generated by contact between tube 80 and disposing portion 40. Furthermore, body unit 10 has the circular two-dimensional shape and the columnar three-dimensional shape in a planar view. Even when tube 80 comes into contact with body unit 10, body unit 10 and tube 80 have a small contact area in this configuration. Tube 80 is thus unlikely to be abraded even in a case where pump 31 is driven with tube 80 being in contact with body unit 10.

When washing unit 100 approaches body unit 10 so as to be attached to body unit 10, magnetic force of joint portion 110 joins washing unit 100 to body unit 10. Washing unit 100 can be attached to body unit 10 even though washing unit 100 is not accurately positioned relatively to body unit 10.

Modifications

The exemplary embodiment exemplarily describes the oral cavity washing device in a practicable mode of the present disclosure, and does not intend to limit the mode. The present disclosure can include, in addition to the exemplary embodiment, following modifications of the exemplary embodiment, any mode achieved by combining at least two of the modifications having no conflict, and the like.

Figure 15:
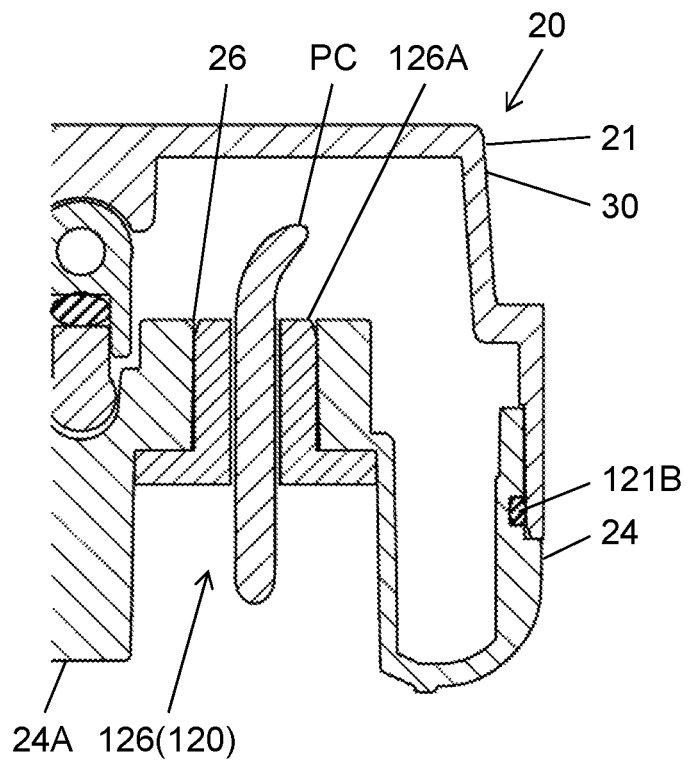
FIG. 15 is a sectional view showing a sixth sealing portion according to a modification.

Sixth sealing portion 126 can be modified appropriately in terms of its configuration. According to a first example, as shown in FIG. 15, bushing 126A is ultrasonically welded, press fitted, or pressure welded to lead-out portion 26 to seal the gap between bushing 126A and lead-out portion 26. According to a second example, power source cord PC is formed integrally with bottom lid 24 to seal the gap between bottom lid 24 and power source cord PC.

Sealing structure 120 can be modified appropriately in terms of its configuration. According to a first example, first sealing portion 121 can optionally exclude at least one of first sealing member 121A, second sealing member 121B, and third sealing member 121C. According to a second example, second sealing portion 122 optionally exclude at least one of first sealing member 122A, second sealing member 122B, and third sealing member 122C. According to a third example, sealing structure 120 can optionally exclude at least one of first sealing portion 121, second sealing portion 122, third sealing portion 123, fourth sealing portion 124, fifth sealing portion 125, and sixth sealing portion 126.

The two-dimensional shape of body unit 10 in a planar view can be modified appropriately. For example, the two-dimensional shape of body unit 10 in a planar view can have a corner.

It is possible to appropriately modify the relation between upper surface 23A of device body 20 and upper surface 75A of tank 70. According to a first example, upper surface 23A of device body 20 is higher than upper surface 75A of tank 70. According to a second example, upper surface 23A of device body 20 is lower than upper surface 75A of tank 70. According to a third example, part of upper surface 75A of tank 70 covers upper surface 23A of device body 20 such that upper surface 75A of tank 70 configures an entire upper surface of body unit 10. According to a fourth example, part of upper surface 23A of device body 20 covers upper surface 75A of tank 70 such that upper surface 23A of device body 20 configures the entire upper surface of body unit 10. According to a fifth example, tank 70 is detachably attached to upper surface 23A of device body 20. The relation between upper surface 23A of device body 20 and upper surface 75A of tank 70 relates to the state where tank 70 is attached to device body 20.

It is possible to appropriately modify the relation between first end surface 103A of second case 101 and upper surface 23A of device body 20. According to a first example, first end surface 103A is higher than upper surface 23A of device body 20. According to a second example, first end surface 103A is lower than upper surface 23A of device body 20. The relation between first end surface 103A of second case 101 and upper surface 23A of device body 20 relates to the state where washing unit 100 is attached to body unit 10.

It is possible to appropriately modify the relation between recess 34 of case body 30 and recess 41 of disposing portion 40. For example, recess 34 of case body 30 is displaced from recess 41 of disposing portion 40 in the width direction of body unit 10. Second end portion 104 of second case 101 according to this example does not face disposing portion 40 in the state where washing unit 100 is attached to body unit 10. Examples of second case 101 having second end portion 104 not facing disposing portion 40 include shortened second case 101.

Elastic member 42 can be modified appropriately in terms of its configuration. According to a first example, first elastic member 42A is provided at part of edge 41B of opening 41A. According to a second example, second elastic member 42B is provided at part of inner peripheral surface 41C of recess 41. According to a third example, second elastic member 42B is provided at part of bottom surface 41D of recess 41. According to a fourth example, elastic member 42 can optionally exclude at least one of first elastic member 42A and second elastic member 42B.

First outer wall 30A of case body 30 can optionally exclude restricting portion 35. According to this example, washing unit 100 attached to body unit 10 is positionally fixed with respect to body unit 10 by only joint portion 110. First outer wall 101A of second case 101 can optionally exclude contact portion 108.

It is possible to appropriately determine whether or not magnet 111A is provided in recess 34 at the center in the height direction of body unit 10. According to a first example, magnet 111A is provided in recess 34 in an upper portion in the height direction of body unit 10. According to a second example, magnet 111A is provided in recess 34 in a lower portion in the height direction of body unit 10.

It is possible to appropriately determine whether or not magnet 111A is provided in first accommodating portion 111C. Magnet 111A is provided on an outer surface side of recess 34 or the like. First joint portion 111 according to this example excludes first accommodating portion 111C. Case body 30 can optionally exclude recess 34.

It is possible to appropriately determine whether or not ferromagnet 112A is provided in second accommodating portion 112B. Ferromagnet 112A is provided on an outer surface side of second case 101 or the like. Second joint portion 112 according to this example excludes second accommodating portion 112B.

It is possible to appropriately modify the relation between thickness TA1 of second outer wall 30B of case body 30 and thicknesses TA2, TA3 of first outer wall 30A of case body 30 in the portion around second outer wall 30B. According to a first example, thickness TA1 is substantially equal to at least one of thicknesses TA2, TA3. According to a second example, thickness TA1 is larger than at least one of thicknesses TA2, TA3.

It is possible to appropriately modify the relation between thickness TB1 of thin portion 101C in second outer wall 101B of second case 101 and thicknesses TB2, TB3 of first outer wall 101A of second case 101 in the portion around second outer wall 101B. According to a first example, thickness TB1 is substantially equal to at least one of thicknesses TB2, TB3. According to a second example, thickness TB1 is larger than at least one of thicknesses TB2, TB3.

Joint portion 110 can be modified appropriately in terms of its configuration. According to a first example, first joint portion 111 includes a ferromagnet, and second joint portion 112 includes a magnet. The configuration according to this example achieves reduction in production cost in comparison to the case where each of first joint portion 111 and second joint portion 112 includes a magnet. According to a second example, first joint portion 111 includes magnet 111A, and second joint portion 112 includes a magnet attracting magnet 111A. The magnet included in joint portion 110 can alternatively be an electromagnet. According to a third example, joint portion 110 physically joins body unit 10 and washing unit 100. Such physical joining is achieved in an exemplary case where a first one of first joint portion 111 and second joint portion 112 includes a hook and a second one of first joint portion 111 and second joint portion 112 includes a hooked portion configured to be joined to the hook. Oral cavity washing device 1 can optionally exclude joint portion 110.

It is possible to appropriately determine whether or not operation part 50 is provided at upper surface 23A of device body 20. Operation part 50 is provided at a side surface of device body 20 or the like.

It is possible to appropriately determine whether or not display part 60 is provided at upper surface 23A of device body 20. Display part 60 is provided at the side surface of device body 20 or the like. Oral cavity washing device 1 can optionally exclude display part 60.

Oral cavity washing device 200 according to a modification differs from oral cavity washing device 1 according to the exemplary embodiment in the following points, and is configured substantially identically to oral cavity washing device 1 according to the exemplary embodiment in remaining points. Elements of oral cavity washing device 200 according to the modification in common with the elements of oral cavity washing device 1 according to the exemplary embodiment will be denoted by identical reference signs and will not be described partially or entirely.

Figure 16:
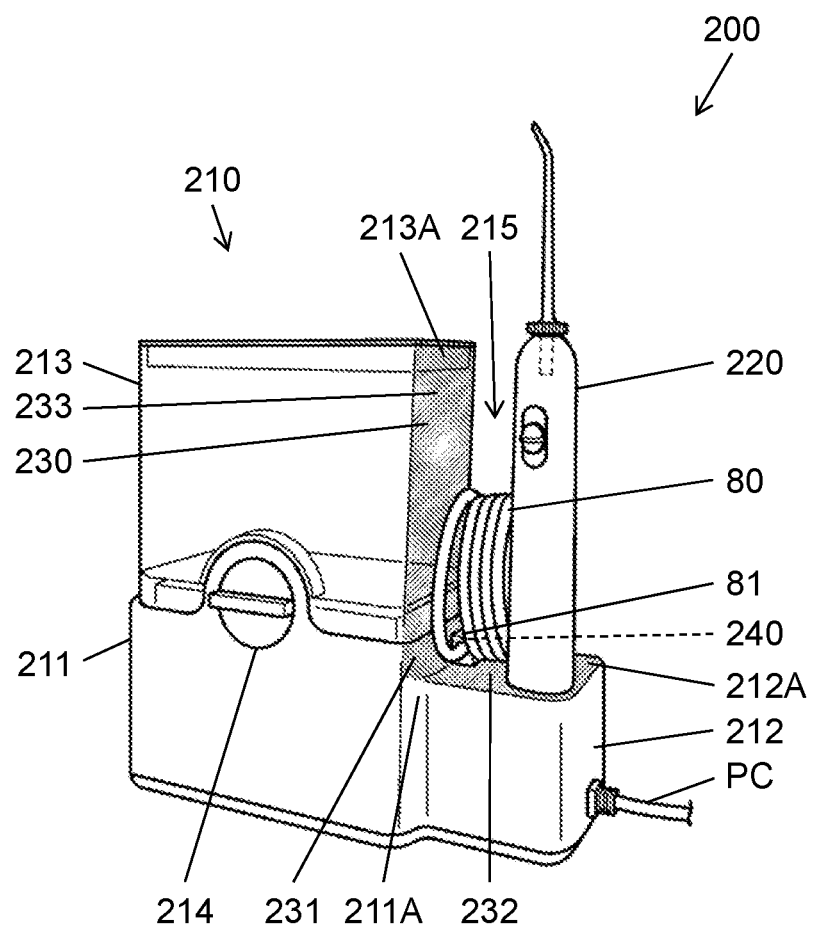
FIG. 16 is a perspective view of an exemplary oral cavity washing device according to a modification.

FIG. 16 shows oral cavity washing device 200 including body unit 210, tube 80, washing unit 220, and power source cord PC. Body unit 210 includes device body 211, support base 212, tank 213, and operation part 214. Device body 211, tank 213, operation part 214, and washing unit 220 are configured substantially identically to device body 20, tank 70, operation part 50, and washing unit 100 according to the exemplary embodiment. Tank 213 is detachably attached onto a top of device body 211. Support base 212 is configured to allow washing unit 220 to be mounted thereon, and is formed integrally with device body 211. For example, washing unit 220 and body unit 210 are joined to each other by magnetic force when washing unit 220 is mounted on support base 212.

Body unit 210 further includes disposing portion 215. Disposing portion 215 is provided at body unit 210 so as to be provided with tube 80 in a state where washing unit 100 is attached to body unit 210. Disposing portion 215 is exemplarily configured by a portion surrounded with washing unit 220 mounted on support base 212, side surface 211A of device body 211, upper surface 212A of support base 212, and side surface 213A of tank 213.

Oral cavity washing device 200 further includes elastic member 230. FIG. 16 shows a dotted portion corresponding to elastic member 230. Elastic member 230 is made of an elastic material or the like, which is unlikely to abrade tube 80 when elastic member 42 is in contact with tube 80. Examples of the elastic material include elastomer. Elastic member 230 is provided at disposing portion 215. Elastic member 230 includes first elastic member 231, second elastic member 232, and third elastic member 233. First elastic member 231 is provided at side surface 211A of device body 211. Second elastic member 232 is provided at upper surface 212A of support base 212. Third elastic member 233 is provided at side surface 213A of tank 213. Elastic member 230 is provided at disposing portion 215 that is likely to contact with tube 80, to absorb vibration of vibrating tube 80. This configuration inhibits abrasion of tube 80. Elastic member 230 can optionally exclude one or two of first elastic member 231, second elastic member 232, and third elastic member 233.

Oral cavity washing device 200 further includes connecting portion 81 and elastic member 240. Connecting portion 81 is provided at disposing portion 215. Elastic member 240 is configured by an O-ring or the like. Elastic member 240 is provided at disposing portion 215 so as to seal connecting portion 81. This configuration is unlikely to allow entry of water to body unit 210 through connecting portion 81.

The oral cavity washing device according to the present disclosure is applicable to any type of an oral cavity washing device for home use or business use.

What is claimed is:

1. An oral cavity washing device comprising:
    a body unit including a pump configured to discharge washing liquid;
    a tube connected to the body unit and configured to allow the discharged washing liquid to flow through the tube;
    a washing unit connected to the tube and configured to discharge the washing liquid;
    a joint portion configured to detachably attach the washing unit to the body unit;
    a disposing portion provided at the body unit and configured to allow the tube to be disposed at the disposing portion in a state where the washing unit is attached to the body unit; and
    an elastic member provided at the disposing portion, wherein:
    the disposing portion has a recess provided at the body unit,
    the elastic member is provided on an inner surface of the recess, the inner surface having a side surface and a bottom surface,
    the elastic member covers at least the side surface, the elastic member including a first surface in contact with the side surface of the inner surface of the recess and a second surface opposite the first surface, and
    the second surface of the elastic member forms a space within the recess and the space is configured to accommodate the tube in a curled state.

2. The oral cavity washing device according to claim 1, wherein the elastic member further includes a portion provided at an edge of an opening of the recess.

3. The oral cavity washing device according to claim 1, further comprising
    a connecting portion connecting the body unit and the tube, wherein:
    the connecting portion is provided at the disposing portion, and
    the elastic member further includes a portion provided to seal the connecting portion.

4. The oral cavity washing device according to claim 1, wherein the first surface is in contact with at least a part of the bottom surface of the inner surface of the recess.

* * * * *